United States Patent
Oiwa

[11] Patent Number: 6,073,541
[45] Date of Patent: Jun. 13, 2000

[54] STOCK MAKING KETTLE

[75] Inventor: Masatoshi Oiwa, Nagoya, Japan

[73] Assignee: MCR Co., Ltd., Aichi-ken, Japan

[21] Appl. No.: 09/426,755

[22] Filed: Oct. 26, 1999

[51] Int. Cl.$^7$ .................................................. A47J 37/12
[52] U.S. Cl. ................................ 99/330; 99/403; 99/407; 99/408; 126/387; 126/391
[58] Field of Search .................... 99/330, 331–336, 99/337, 403–418, 447; 126/391, 39 R, 350 R, 387, 92 AC, 373; 426/417, 438, 523; 431/329; 210/136, DIG. 8

[56] References Cited

U.S. PATENT DOCUMENTS

| | | | |
|---|---|---|---|
| 1,994,555 | 3/1935 | Wilson | 99/408 |
| 3,990,433 | 11/1976 | Keating | 126/391 |
| 4,603,622 | 8/1986 | Beck | 99/403 |
| 4,947,824 | 8/1990 | Ejiri et al. | 126/391 |
| 5,184,539 | 2/1993 | Oiwa | 99/408 |
| 5,253,566 | 10/1993 | McCabe et al. | 99/330 X |
| 5,282,458 | 2/1994 | Trimble | 126/373 X |
| 5,417,202 | 5/1995 | Cote | 99/330 X |
| 5,486,370 | 1/1996 | Bivens | 426/417 |
| 5,597,601 | 1/1997 | Griffin | 99/403 X |
| 5,609,093 | 3/1997 | Hohler et al. | 99/408 |
| 5,617,776 | 4/1997 | King et al. | 99/403 X |
| 5,632,197 | 5/1997 | Lubawy et al. | 99/403 |

Primary Examiner—Timothy Simone
Attorney, Agent, or Firm—Arent Fox Kintner Plotkin & Kahn, PLLC

[57] ABSTRACT

A stock making kettle has a boiling tank opened at an upper part and having a stock outlet port on a bottom surface, a stock material cage made of a net-shaped member and installed movable into or out of the boiling tank, a scum removing plate covering the upper opening of the boiling tank and having a scum discharge port, a combustion chamber provided with burners and installed at lower side of the bottom surface of the boiling tank, and a flue connected to the combustion chamber and having an exhaust port and installed coming into contact with the bottom surface and the side surface of the boiling tank.

6 Claims, 6 Drawing Sheets

STOCK MAKING KETTLE

BACKGROUND OF THE INVENTION (1) Field of the Invention

The present invention relates to a stock making kettle which makes a stock from a dried bonite, a tangle or the like in an eating house such as a noodle shop.

(2) Description of Related Art

In the prior art, in order to obtain a stock from stock materials such as a dried bonite, a tangle or the like (hereinafter referred to simply as "stock materials") in an eating house such as a noodle shop, in general, stock materials and water are introduced into a noodle kettle, and the noodle kettle is heated and the water is boiled thereby the stock making work has been performed.

In such a stock making work in the prior art, however, in order to make the stock of high quality, the cook must be always skim off the scum (component such as a rough taste included in the stock materials) that rises to the surface of the cooking water.

After the first stock is made in the above-mentioned stock making work, the stock making work for the second stock is performed in that the stock materials are filtered out and are introduced into the noodle kettle again, and further water is added and the noodle kettle is heated and the water is boiled again. Therefore a problem exists in that much labor is necessary for the stock making work.

Also the boiling treatment in the noodle kettle and the work skimming off the scum in the upper open state of the noodle kettle are not favorable from the aspect of the thermal efficiency.

SUMMARY OF THE INVENTION

An object of the present invention is to solve the above-mentioned problems, and to provide a stock making kettle where the stock making work for the first stock and the second stock can be performed continuously and the work skimming off the scum can be performed automatically.

The stock making kettle according to the present invention has a boiling tank opened at an upper part and having a stock outlet port on a bottom surface; a stock material cage of a net-shaped member and installed movable into or out of the boiling tank; a scum removing plate covering the whole surface of the upper opening of the boiling tank and having a scum discharge port; a combustion chamber provided with burners and installed at lower side of the bottom surface of the boiling tank; and a flue connected to the combustion chamber and having an air exhaust port and installed coming into contact with the bottom surface and the side surface of the boiling tank, wherein the scum removing plate is provided with a scum cutting wall in an upward projection formed at an opening of the scum discharge port, and with a slope formed downward from the substantially center part of the scum removing plate toward the outer circumferential side.

In the present invention constituted as above described, after the first stock is taken, the second stock making work can be performed continuously without necessitating any preparation process. Further, the human labor can be reduced, because the scum removing plate is installed, so that the scum generated during the boiling can be automatically discharged and removed.

Also if a scum receiving part with upper side opened for receiving the scum or the like falling from the outer circumferential edge of the scum removing plate is formed on the outer circumference in the vicinity of the upper end of the side surface of the boiling tank, the scum or the like falling from the outer circumferential edge of the scum removing plate can be received.

Further, if a trap is formed by the outer circumferential edge and the scum receiving part so that making the stock excluded the scum or the like to the boiling tank, the stock discharged together with the scum can be returned into the boiling tank without accompanied by the scum. At this time, the scum receiving part is provided on the upper side of the inner circumferential side with a return flow path for returning the scum to the boiling tank. And the outer circumferential edge of the scum removing plate is supported by the boiling tank at lower side from the return flow path and spaced by a gap from the bottom part of the scum receiving plate.

Further if a discharge flow path opened upward from the circumferential edge of the scum removing plate for discharging the scum or the like collected at the scum receiving part is arranged to the scum receiving part, the scum or the like collected at the scum receiving part can be discharged through the discharge flow path.

Moreover if the scum receiving part is provided at the bottom part with an opening to be connected to a discharge conduit, and a tap with a through hole penetrating in the vertical direction is arranged at the opening and the discharge flow path is constituted by the through hole and the discharge conduit, by removing the tap, the scum or the like and the stock can be discharged by the discharge flow path thereby the scum receiving part can be easily cleaned.

Further if a cover capable of covering the upper opening of the boiling tank including the scum removing plate is detachably arranged on the upper side of the scum removing plate, to put the foreign substance into the boiling tank can be prevented.

BRIEF DESCRIPTION OF THR DRAWINGS

DESCRIPTION OF THE PREFERRED EMBODIMENTS

Figure 1:
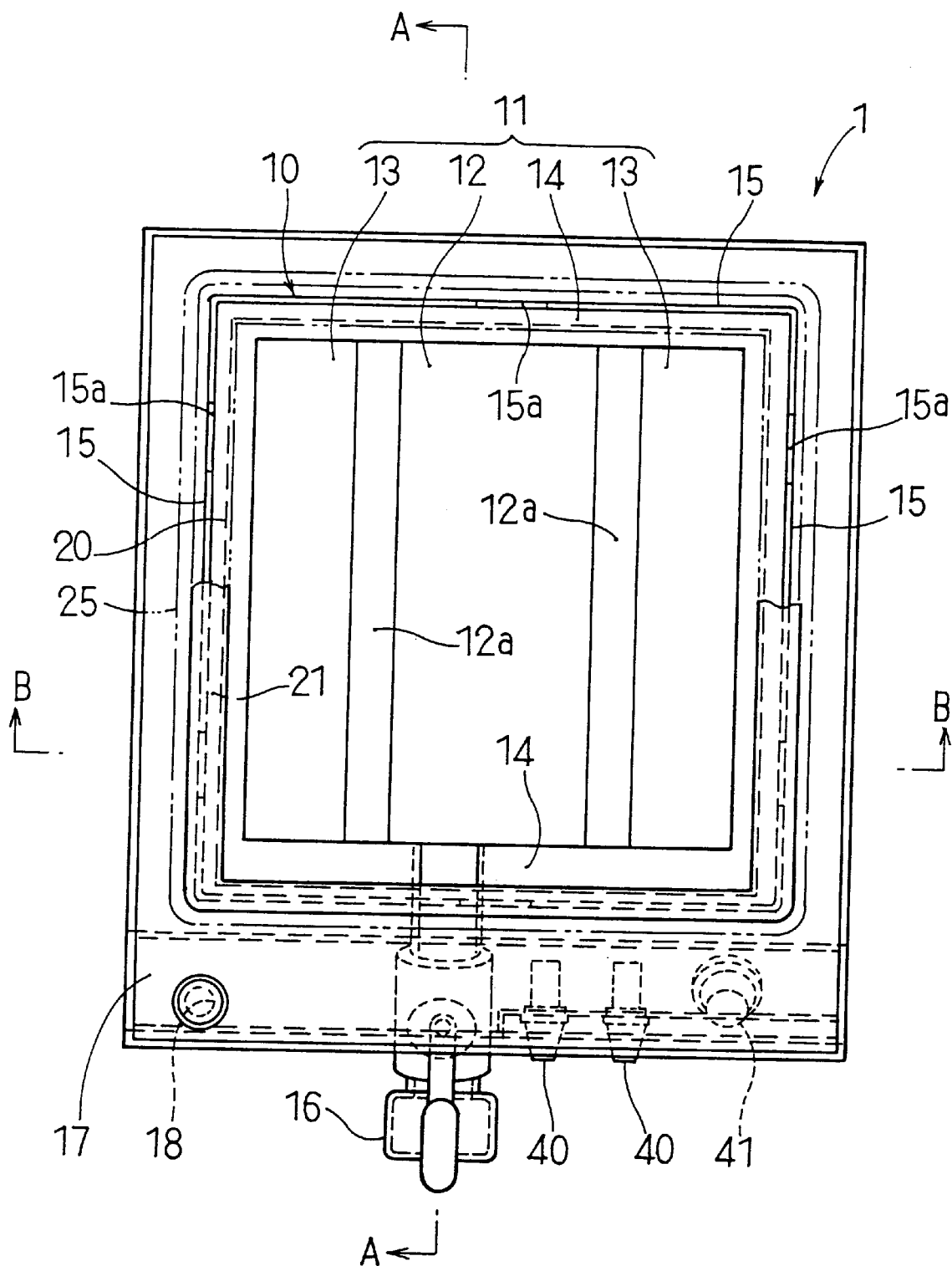
FIG. 1 is a plan view of a stock making kettle in an embodiment of the invention.

The present invention will be described as follows, which based on embodiments as shown in the drawings. The present invention is not limited to the embodiments. All modifications within requirements of claims or equivalents regarding the requirements shall be included within the scope of the claims.

Figure 2:
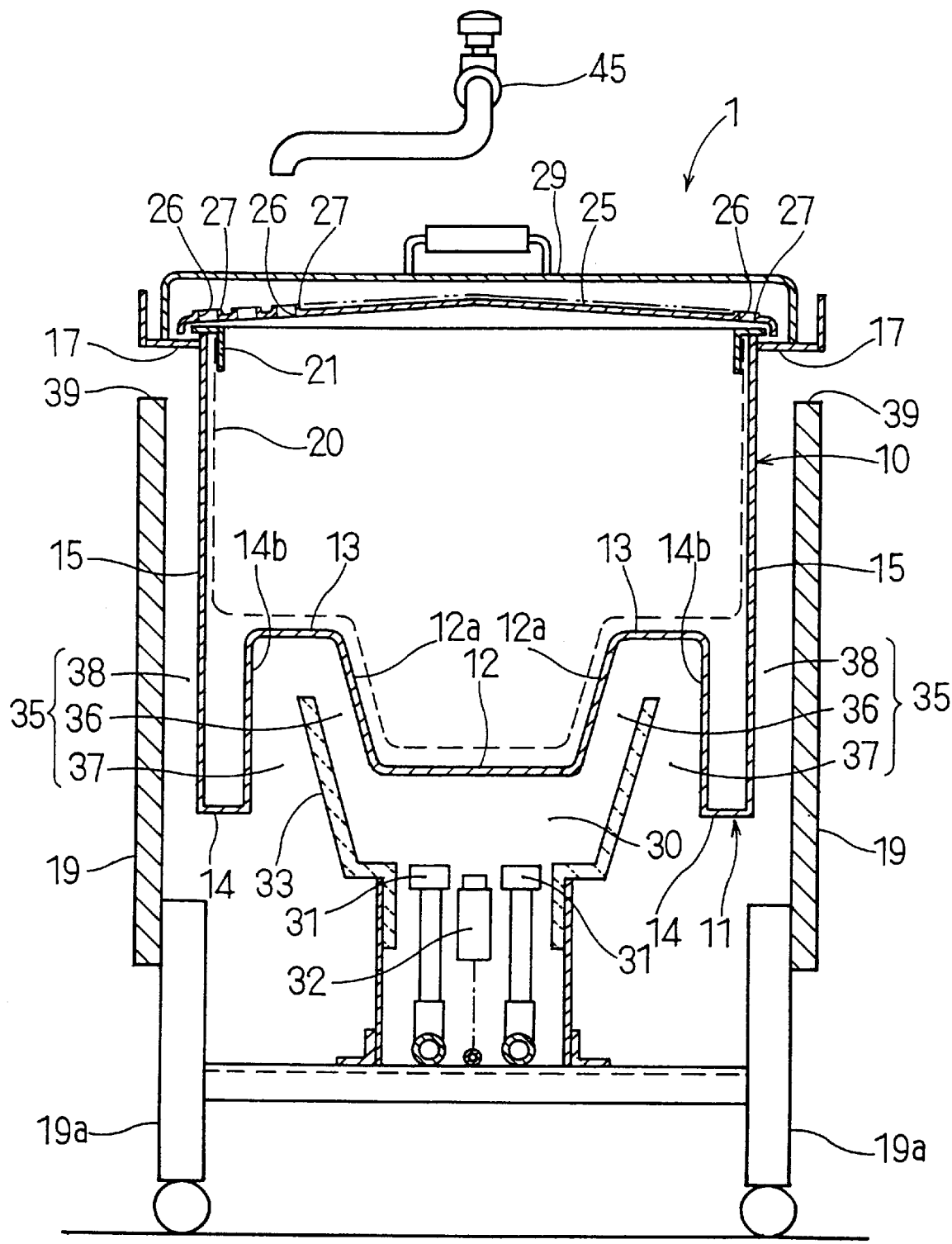
FIG. 2 is a sectional view from arrow line B—B in FIG. 1.
Figure 3:
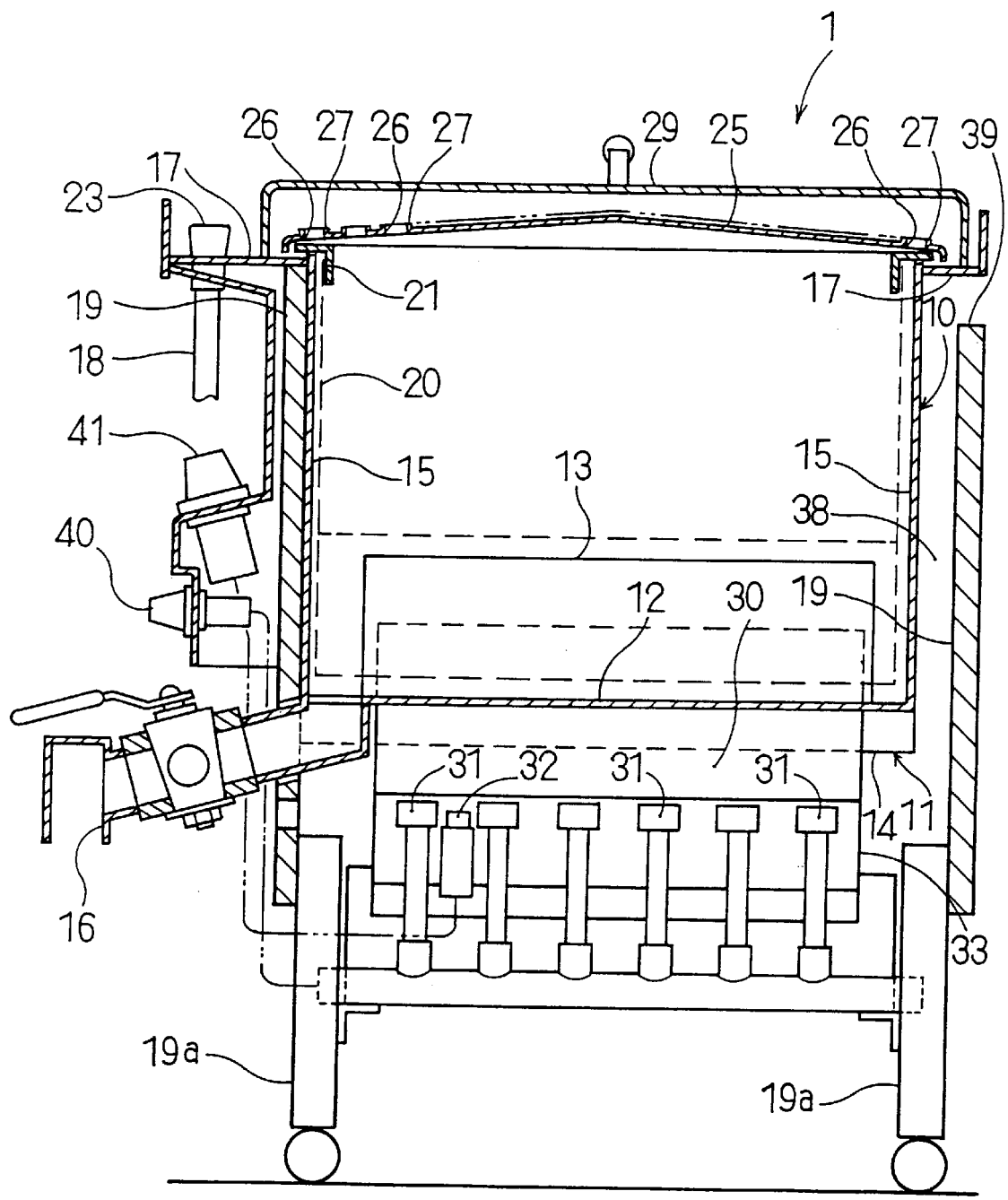
FIG. 3 is a sectional view from arrow line A—A in FIG. 1.

A stock making kettle in this embodiment, as designated by reference numeral 1 in FIGS. 1 to 3, comprises a boiling tank 10 having a stock outlet port 16, a stock material cage 20 provided movable into or out of the boiling tank 10, a scum removing plate 25 covering an upper opening of the boiling tank 10 and having a scum discharge port 26, a combustion chamber 30 provided at lower side of a bottom surface 11 of the boiling tank 10, and a flue 35 provided contacting with the bottom surface 11 and side surfaces of the boiling tank 10.

The boiling tank 10 is formed into rectangular box shape with upper side opened by the bottom surface 11 and the four side surfaces 15. The bottom surface 11 is formed into three stages by a depressed bottom part 12, two salient bottom parts 13 and a circumferential bottom part 14. A plurality of return flow paths 15a of notched shape are installed on the upper end parts of the side surfaces 15, and a stock outlet port 18 having a cock is installed on the circumferential bottom part 14.

Figure 4:
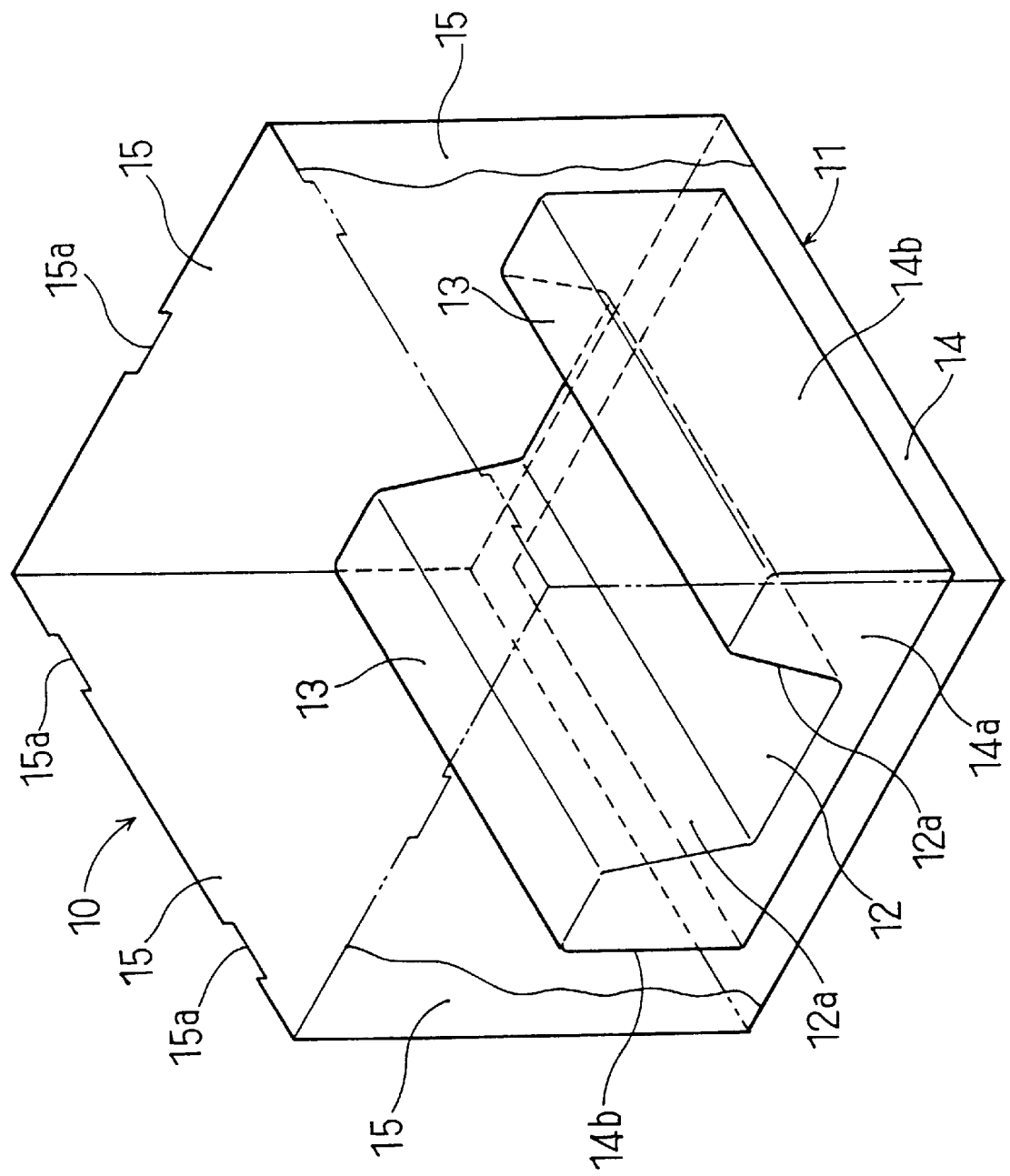
FIG. 4 is a perspective view partly in section showing shape of a bottom surface of a boiling tank in the embodiment.

The bottom surface 11, as shown in FIGS. 2 and 4, comprises a depressed bottom part 12 having a prescribed height and extending in parallel to one side surface 15 and in valley shape in the longitudinal direction, two salient bottom parts 13 formed in a higher position than that of the depressed bottom part 12 and extending interposing the depressed bottom part 12 therebetween and in parallel to the depressed bottom part 12 and in angle shape in the longitudinal direction, and a circumferential bottom part 14 formed in a lower position than that of the depressed bottom part 12 and surrounding the depressed bottom part 12 and the salient bottom parts 13, 13 and coming into contact with the four side surfaces 15. In addition, numeral 12a designates a rise part between the depressed bottom part 12 and the salient bottom part 13. A rise part 14a is provided between a short side part of the circumferential bottom part 14 and the depressed bottom part 12, and a long side part of the salient bottom part 13. A rise part 14b is provided between the circumferential bottom part 14 and the salient bottom part 13.

A scum receiving part 17 with upper side opened is formed on the outer circumference in the vicinity of the upper end of the boiling tank 10 for receiving a scum or the like falling from an outer circumferential edge of a scum removing plate 25. Also the scum receiving part 17 is provided with a discharge conduit 18 arranged downward for discharging the collected scum or the like. The three lateral sides of the boiling tank 10 are surrounded by a heat insulation wall 19 through an outer flue 37 as described later, and the heat insulation wall 19 and the boiling tank 10 are supported by four legs 19a. In addition, a rubber tap having a through hole 23a is detachably mounted on the upper end part of the discharge conduit 18.

A stock material cage 20 is made of, for example, a net-shaped member of stainless steel, and is provided with a frame 21 at an upper edge portion and is formed movable into or out of the boiling tank 10. The frame 21 of the stock material cage 20 is constituted to be supported by the opening edge part of the boiling tank 10.

Figure 5:
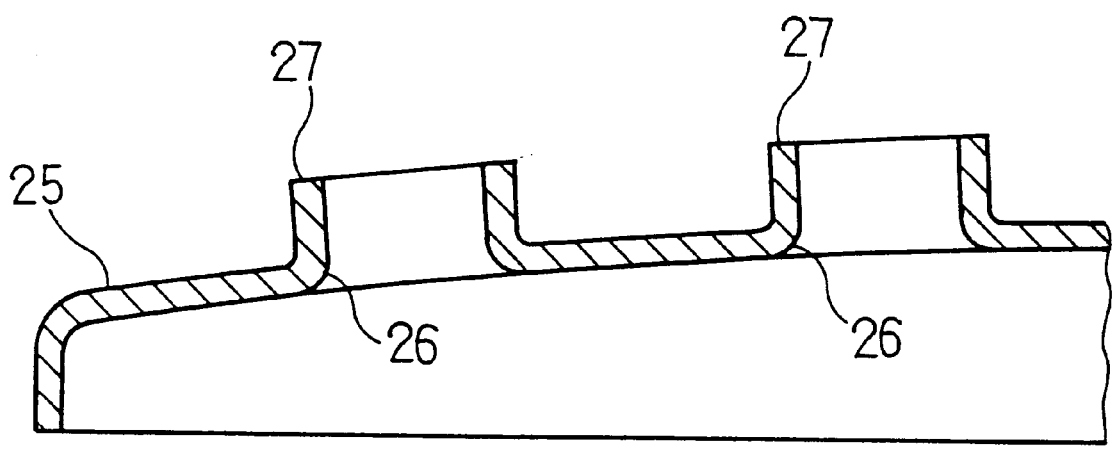
FIG. 5 is a fragmentary enlarged sectional view of a scum removing plate in the embodiment.

The scum removing plate 25 is formed having a slope formed downward gradually from the center part toward the outer circumferential part and also having a number of scum discharge port 26. As shown in FIG. 5, the scum discharge port 26 is provided with a scum cutting wall 27 constituted by an annular projection on the upper side of the opening.

The scum removing plate 25 covers the stock material cage 20. Further, a gap to form a trap 28 is provided between the outer circumferential edge part 25a and the upper surface of the scum receiving part 17. In addition, the height of the lower end of the outer circumferential edge part 25a is made lower than that of the return flow path 15a.

On the upper side of the scum removing plate 25, a detachable cover 29 is installed, which can cover the upper opening of the boiling tank 10 including the scum removing plate 25 and the stock material cage 20.

A combustion chamber 30 is provided with a plurality of main burners 31, a pilot burner 32 and a combustion cylinder 33. The combustion chamber 30 is installed at lower side of the depressed bottom part 12 of the bottom surface 11 of the boiling tank 10.

The combustion cylinder 33 is made of ceramic material radiating far infrared rays. As shown in FIG. 2, the lower part of the combustion cylinder 33 surrounds the lateral side of the main burners 31 and the pilot burner 32, and the upper part thereof is projected between the depressed bottom part 12 and the circumferential bottom part 14 at the lower side of the salient bottom part 13. Thereby an inner flue 36 connected to the combustion chamber 30 and an outer flue 37 leading to the inner flue 36 are formed at lower side of the bottom surface 11 of the boiling tank 10.

The flue 35 comprises the inner flue 36 and the outer flue 37, as above described, and a circumferential flue 38. The circumferential flue 38 is formed between the side surface 15 of the boiling tank 10 and the heat insulation wall 19 so as to surround the lateral side of the side surface. The lower part of the circumferential flue 38 leads to the lower part of the outer flue 37 through the lower side of the circumferential bottom part 14. In addition, an air exhaust port 39 penetrating the heat insulation wall 19 is installed on the upper part of the circumferential flue 38.

The main burner 31 of the combustion chamber 30 is connected to the gas feed pipe through a gas main cock 40, and the pilot burner 32 is connected to the gas feed pipe through a natural put-out state preventing pilot 41. A hot-water supply valve 45 connected to a hot-water supplier is installed on the upper side of the boiling tank 10.

Next, an action of the stock making kettle 1 constituted in such manner will be described.

First, an example of the first stock making work will be described. At first, the stock material cage 20 is taken out of the boiling tank 10 and a prescribed amount of the stock materials is accomodated thereon. Then, the stock material cage 20 is settled within the boiling tank 1. At this time, the stock outlet port 16 is closed. Subsequently, a prescribed amount of water is supplied into the boiling tank 10, and the water level is made the standard water level Q. The upper opening of the boiling tank 10 is covered by the scum removing plate 25 and the cover 29, then the stock materials are immersed intact for a prescribed time.

Subsequently the main burners 31 are ignited and the boiling tank 10 is heated. Then the combustion gas at high temperature generated in the combustion chamber 30 passes through the inner flue 36 and the outer flue 37. Then, the combustion gas passes through the circumferential flue 38, while the atmosphere at lower side of the circumferential bottom part 14 of the boiling tank 10 is involved therein and the temperature is decreased. Finally, the combustion gas is exhausted out of the exhaust port 39.

On the other hand, the hot water heated in the boiling tank 10 is transferred in convection within the boiling tank 10 and rises while accompanied by a large number of bubbles. Then the hot water comes into contact with the stock materials within the stock material cage 20 and permeates into the stock materials, thereby the stock component is dissolved in it. Also from the stock materials, scum such as a bitter taste included in the stock materials is drawn out of the stock materials and then rises on the hot water surface attendant on the bubbles.

Figure 6:
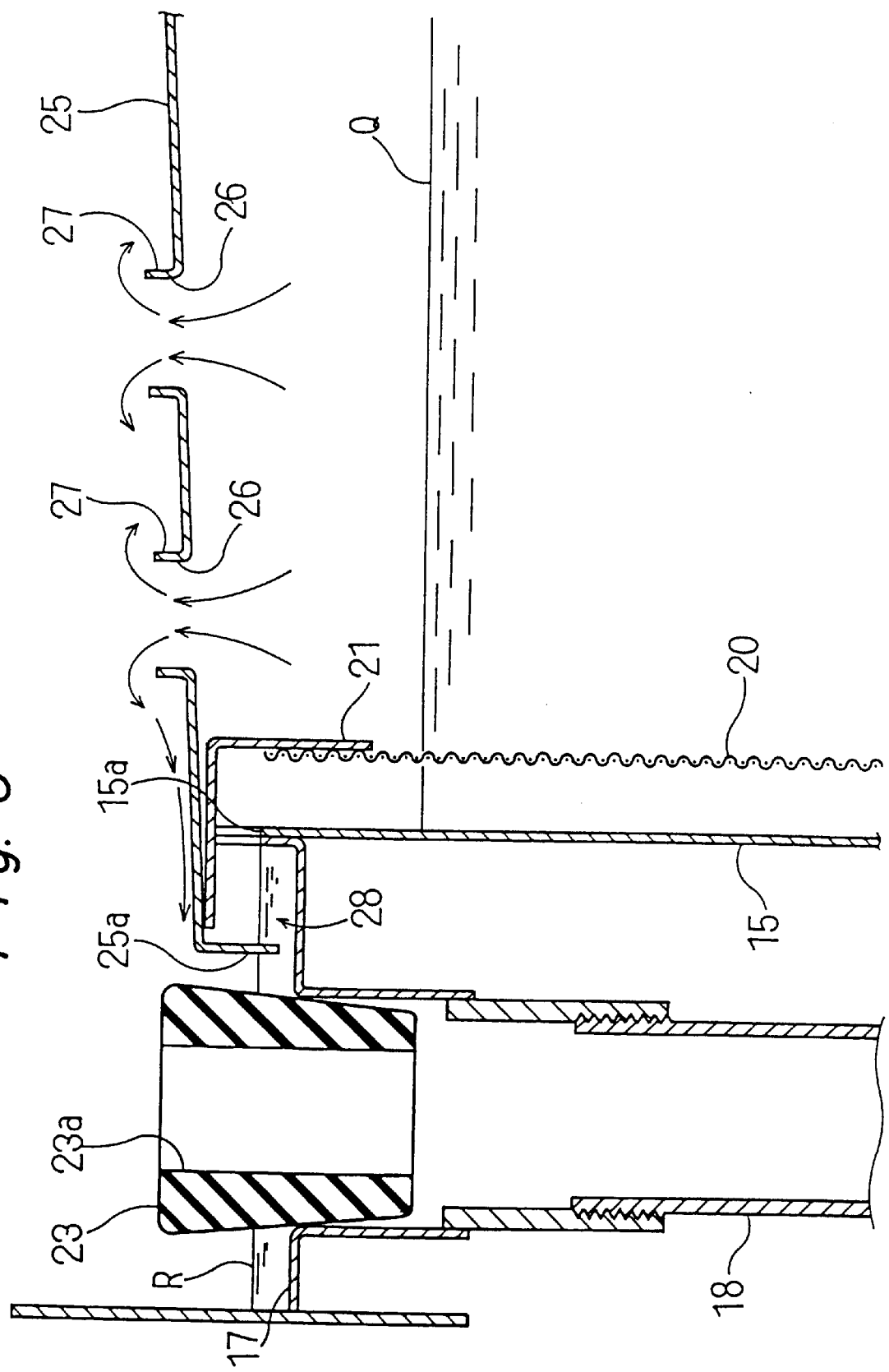
FIG. 6 is a fragmentary enlarged sectional view explaining discharging of the scum.

Bubbles accompanied by scum and some liquid component are raised by succeeding bubbles on the hot water surface, and are moved onto the upper surface of the scum removing plate 25 from the scum discharge port 26 in the scum removing plate 25 and discharged. The counterflow into the boiling tank 10 is inhibited by the scum removing wall 27, so that bubbles overflowing onto the upper surface of the scum removing plate 25 flows down in the outer circumferential edge direction by the slope of the scum removing plate 25. Further the bubbles fall onto the scum receiving part 17 and are collected. On the scum receiving part 17, the scum and the bubbles are in the suspended state on the liquid component. When the liquid component attains to the level (water level R) of the return flow path 15a, the liquid component flows beyond the return flow path 15a and is returned into the boiling tank 10 (refer to FIG. 6). Then the return flow of the scum and the bubbles is inhibited by the trap 28. Also when the scum and the bubbles are collected on the scum receiving part 17 so as to overflow, the scum and the bubbles are exhausted from the through hole 23a of the rubber tap 23 through the discharge conduit 18.

The scum removing work as above described is performed automatically and continuously attendant on the boiling within the boiling tank 10. During the process, the scum removing plate 25 and the cover 29 prevent the radiation of the heat, which cover the upper opening of the boiling tank 10.

Subsequently the main burners 31 are extinguished, and the rubber tap 23 is removed and the scum, so that the liquid component and the like remaining on the scum receiving part 17 are discharged. Then the stock produced within the boiling tank 10 is taken out of the stock outlet port 16. The stock materials after making the first stock remain in the stock material cage 20. In a series of the processes as above described, the first stock making work is finished.

Next, an example of the second stock making work will be described. Subsequently to the finishing of the first stock making work, the hot water of the suitable temperature is supplied from the hot water feed valve 45 into the boiling tank 10 in the finishing state to the standard water level Q.

Subsequently the main burners 31 are ignited and the boiling tank 10 is heated. After the scum removing process similar to that in the above-mentioned first stock making work, the hot water within the boiling tank 10 further dissolves the stock component therein from the stock materials after making the first stock so as to make the second stock in the boiling tank 10.

The second stock obtained in such process is taken out of the stock outlet port 16. In a series of the processes, the second stock making work is finished. The second stock making work in such manner can be immediately performed continuously after finishing the first stock making without necessitating any preparation process.

The boiling tank 10 is constituted in that the depressed bottom part 12 in rectangular shape is provided at the center part of the bottom part 11 and the salient bottom parts 13 are provided on both sides of the depressed bottom part 12. Therefore, a large heat exchange area can be obtained between the boiling tank 10 and the flue 35. For example, in the boiling tank 10 of width 60 cm, length 60 cm and full water volume 70L, when width of the depressed bottom part 12 is made 28 cm, width of the salient bottom part 13 is made 7 cm and height of the rise part 14a is made 20 cm, the whole area of the bottom part 11 becomes about 7000 cm$^2$, and in comparison with the area 3600 cm$^2$ in the case of constitution of the bottom surface by one flat sheet, the heat exchange area of just more than 1.9 times can be obtained and the thermal efficiency is improved.

As above described, according to the stock making kettle of the present invention, after the first stock is taken, the second stock making work can be performed continuously without necessitating any preparation process.

The human labor can be reduced, because the scum removing plate is installed so that the scum generated during the boiling can be automatically discharged and removed.

Also since the scum receiving part with the upper side opened for receiving the scum falling from the outer circumferential edge of the scum receiving plate is formed on the outer circumference in the vicinity of the upper end of the side surface of the boiling tank, the scum falling from the outer circumferential edge of the scum removing plate can be received.

Further the stock discharged together with the scum can be reduced into the boiling tank without accompanied by the scum, because a trap is formed by the outer circumferential edge and the scum receiving part so that making the stock excluded the scum or the like to the boiling tank.

Further, if the discharge flow path opened upward from the outer circumferential edge of the scum removing plate for discharging the scum collected at the scum receiving part is arranged to the scum receiving part, the scum or the like collected at the scum receiving part can be discharged through the discharge flow path.

Moreover, when the scum receiving part is provided at the bottom part with an opening to which the discharge conduit is connected, and the tap with the through hole penetrating in the vertical direction is arranged at the opening, and the discharge flow path is constitute by the through hole and the discharge conduit, if the tap is removed, the scum or the like can be discharged by the discharge flow path, thereby the scum receiving part can be easily cleaned.

Further when the cover for covering the upper opening of the boiling tank is detachably arranged on the upper side of the scum removing plate, to put the foreign substance into the boiling tank can be prevented.

What is claimed is:

1. A stock making kettle comprising:
   a boiling tank opened at an upper part and having a stock outlet port on a bottom surface;
   a stock material cage made of a net-shaped member and installed movable into or out of said boiling tank;
   a scum removing plate covering the whole surface of the upper opening of said boiling tank and having a scum discharge port;
   a combustion chamber provided with burners and installed at lower side of the bottom surface of said boiling tank,
   a flue connected to said combustion chamber and having an exhaust port and installed coming into contact with the bottom surface and the side surface of said boiling tank; and
   said scum removing plate being provided with a scum cutting wall in an upward projection formed at an opening of said scum discharge port, and with a slope formed downward from the substantially center part of said scum removing plate toward the outer circumferential side.

2. A stock making kettle as set forth in claim 1, wherein a scum receiving part with upper side opened for receiving a scum falling from an outer circumferential edge of said scum removing plate is formed on the outer circumference in the vicinity of the upper end of the side surface of said boiling tank.

3. A stock making kettle as set forth in claim 2, wherein said scum receiving part is provided at the upper part in the inner circumferential side with a return flow path so as to return the stock to said boiling tank, the outer circumferential edge of said scum removing plate is supported by said boiling tank at lower side than said return flow path and in spacing by a gap from the bottom part of said scum receiving part, and the outer circumferential edge of said scum removing plate and said scum receiving part constitute a trap so that the stock excluding the scum is returned to said boiling tank.

4. A stock making kettle as set forth in claim 2, wherein a discharge flow path opened at upper side than the outer circumferential edge of said scum removing plate is arranged at said scum receiving part so that the scum collected at said scum receiving part is discharged.

5. A stock making kettle as set forth in claim 4, wherein said scum receiving part is provided at the bottom part with an opening connected to a discharge conduit, a tap provided with a through hole penetrating in the vertical direction is arranged at said opening, and said through hole and said discharge conduit constitute said discharge flow path.

6. A stock making kettle as set forth in claim 2, wherein a cover capable of covering the upper opening of said boiling tank including said scum removing plate is detachably arranged at upper side of said scum removing plate.

\* \* \* \* \*